(12) United States Patent
Kramer

(10) Patent No.: US 7,429,049 B2
(45) Date of Patent: Sep. 30, 2008

(54) CLAMPING APPARATUS FOR FIXING A COLLET TO A CHUCK

(75) Inventor: Dietmar Kramer, Daenikon (CH)

(73) Assignee: Erowa AG, Reinach (CH)

( * ) Notice: Subject to any disclaimer, the term of this patent is extended or adjusted under 35 U.S.C. 154(b) by 363 days.

(21) Appl. No.: 11/114,529

(22) Filed: Apr. 26, 2005

(65) Prior Publication Data

US 2005/0248103 A1    Nov. 10, 2005

(30) Foreign Application Priority Data

May 4, 2004    (CH) ..................................... 0786/04

(51) Int. Cl.
*B23B 31/177* (2006.01)
(52) U.S. Cl. ...................... 279/2.03; 279/2.12; 279/46.3
(58) Field of Classification Search .............. 279/2.01, 279/2.02, 2.03, 2.1, 2.11, 2.12, 43.4, 46.1, 279/46.2, 46.3, 75, 76, 133
See application file for complete search history.

(56) References Cited

U.S. PATENT DOCUMENTS

| 1,302,619 | A | * | 5/1919 | Woglom | .................... | 279/46.3 |
| 2,644,929 | A | * | 7/1953 | Kumpf | ....................... | 333/263 |
| 3,583,714 | A | * | 6/1971 | Weltzer et al. | ................ | 279/51 |
| 3,583,715 | A | * | 6/1971 | Jahrl | ........................... | 279/75 |
| 3,744,809 | A | * | 7/1973 | Bennett | ........................ | 279/121 |
| 4,632,407 | A | * | 12/1986 | Maxam et al. | ............... | 279/121 |
| 4,761,104 | A | * | 8/1988 | Hillestad | ..................... | 409/175 |
| 5,678,967 | A | * | 10/1997 | Savoie | ......................... | 409/233 |
| 2003/0184028 | A1 | | 10/2003 | Schlotterer | | |
| 2007/0090611 | A1 | * | 4/2007 | Soroka et al. | .............. | 279/4.12 |

FOREIGN PATENT DOCUMENTS

| DE | 299 21 03 | 3/2000 |
| FR | 2 694 222 | 2/1994 |
| GB | 729 051 | 5/1995 |
| JP | 53100723 | 5/1980 |

* cited by examiner

*Primary Examiner*—David P. Bryant
*Assistant Examiner*—Eric A Gates
(74) *Attorney, Agent, or Firm*—Maginot, Moore & Beck

(57) ABSTRACT

A clamping apparatus comprises a chuck member and a collet member that includes, at its rear side, a peripheral shoulder. The top side of this shoulder is provided with a thrust surface adapted to engage radially displaceable clamping balls of the chuck member. The bottom side of the shoulder is provided with four centering grooves that cooperate with four centering cams provided in the chuck member. Upon clamping the collet member to the chuck member, the collet member is positioned in X- and Y-directions as well as regarding the angular orientation around the Z-axis by means of the centering cams of the chuck member engaging the centering grooves of the collet member. The collet member is provided with an annular rear surface adapted to rest on Z-reference surface portions of the chuck member upon clamping the collet member to the chuck member.

14 Claims, 3 Drawing Sheets

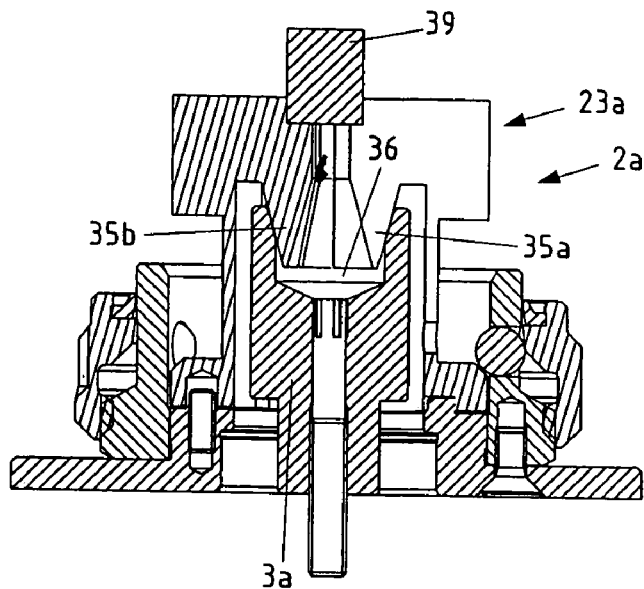
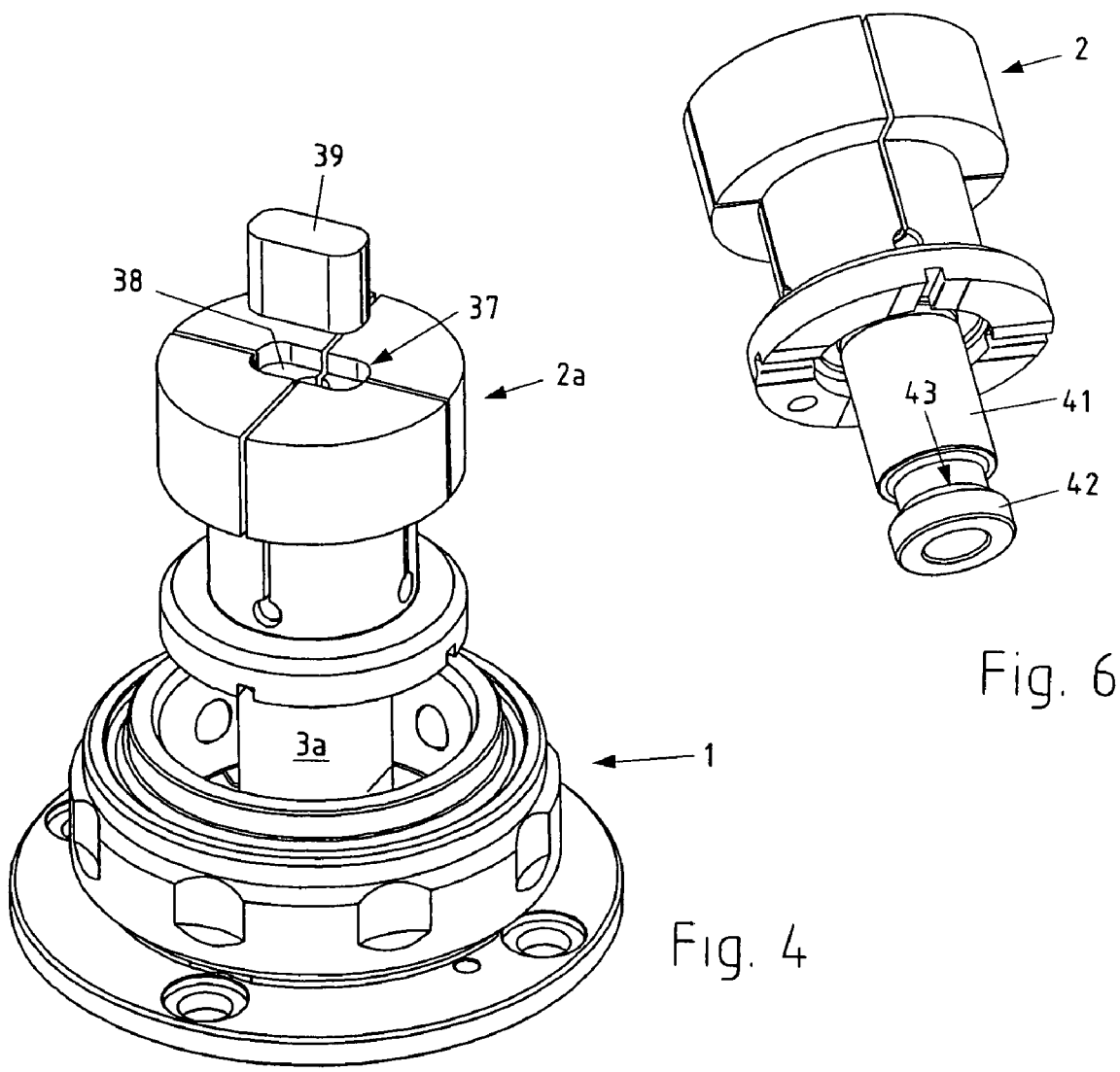

CLAMPING APPARATUS FOR FIXING A COLLET TO A CHUCK

BACKGROUND OF THE INVENTION

The present invention refers to a clamping apparatus for fixing a collet member to a chuck member.

With the expression "Collet Member", in the present context, a slotted clamping sleeve member is understood, having a conical portion, which is adapted to clamp an object, particularly a work piece to be machined, by radially forcing out or forcing in the clamping jaws of the collet member. Such collet members are used, for instance, with turning lathes where they have a female thread to be screwed onto a threaded spindle of the lathe.

A fundamental disadvantage of known conventional collet members consists in the fact that both their angular position around the rotational axis, i.e. the central longitudinal or Z-axis, as well as their position in the direction of the extension of the Z-axis is not or, at least, not exactly defined with regard to the position of the spindle. In machining axially symmetrical work pieces in a lathe, the aforementioned disadvantage is of secondary importance. However, more and more often the need arises to clamp work pieces to machine tools other than lathes that are not axially symmetrical by means of collet members; in this case, the exact definition of the position of the work piece not only in X- and Y- direction, but also in Z-direction, i.e. along the extension of the central longitudinal axis, as well as with regard to their angular orientation around the Z-axis is highly desirable.

Hitherto, in order to use collet members in a positionally well defined manner, i.e. both in X- and Y-directions as well as in Z-direction and regarding the angular orientation around the Z-axis, intermediate pallet members had to be used to which the collet member is fixed and which are provided with positioning or centering elements. That pallet member, then, can be attached to a corresponding chuck member provided with positioning or centering elements cooperating with the elements of the intermediate pallet member.

PRIOR ART

The patent publication FR-A-2,694,222 discloses a tool drill chuck, comprising a tool holding member, preferably in the shape of a tubular sleeve member, a disc-shaped member that can be connected to the tool holding member, and a device adapted to be rotated by a machine to rotate the afore mentioned disc-shaped member. Thereby, the tool holding member, designed as a hollow rotational element with a closed end and engaging the disc-shaped member, comprises two axially aligned portions, one of which serving for receiving a drill bit and the other one serving for receiving a tap for cutting a thread in a bore created by the afore mentioned drill bit. This publication does not disclose an informative basis for an exact positioning of a work piece in X- and Y-directions. Neither are any suggestions disclosed for realizing an exact positioning of the work piece in Z-direction.

OBJECTS OF THE INVENTION

It is an object of the present invention to provide a clamping apparatus for fixing a collet member to a chuck member directly, easily, quickly and in a well defined position in X-, Y- and Z-directions as well as regarding its angular orientation around the Z-axis.

SUMMARY OF THE INVENTION

This and other objects are met with a clamping apparatus, comprising a chuck member having clamping means adapted to clampingly fix a collet member, and a collet member adapted to be fixed to the chuck member and having first centering means for aligning the position of the collet member with regard to the chuck member.

The chuck member is provided with second centering means for aligning the position of the collet member with regard to the chuck member and cooperating with the first centering means of the collet member.

The first centering means of the collet member comprises a plurality of first centering elements located at the rear side of the collet member facing the chuck member, and the second centering means of the chuck member comprises a plurality of second centering elements corresponding to the plurality of first centering elements of the collet member regarding size and location. The second centering elements are adapted to engage the first centering elements of the collet member upon fixing the collet member to the chuck member to align the collet member with regard to the chuck member at least in X- and Y-directions.

The collet member is provided with a thrust surface adapted to be engaged by the clamping means of the chuck member to clampingly fix the collet member to the chuck member, or the collet member comprises a clamping stud provided with a thrust surface adapted to be engaged by the clamping means of the chuck member to clampingly fix the collet member to the chuck member.

BRIEF DESCRIPTION OF THE DRAWINGS

In the following, embodiments of the clamping apparatus according to the invention will be further described, with reference to the accompanying drawings, in which:

FIG. 4 shows a perspective view of another embodiment of the clamping apparatus;

FIG. 5 shows a longitudinal sectional view of the clamping apparatus according to FIG. 4; and FIG. 6 shows a collet member provided with a clamping stud.

DETAILED DESCRIPTION OF THE PREFERRED EMBODIMENT

Figure 1:
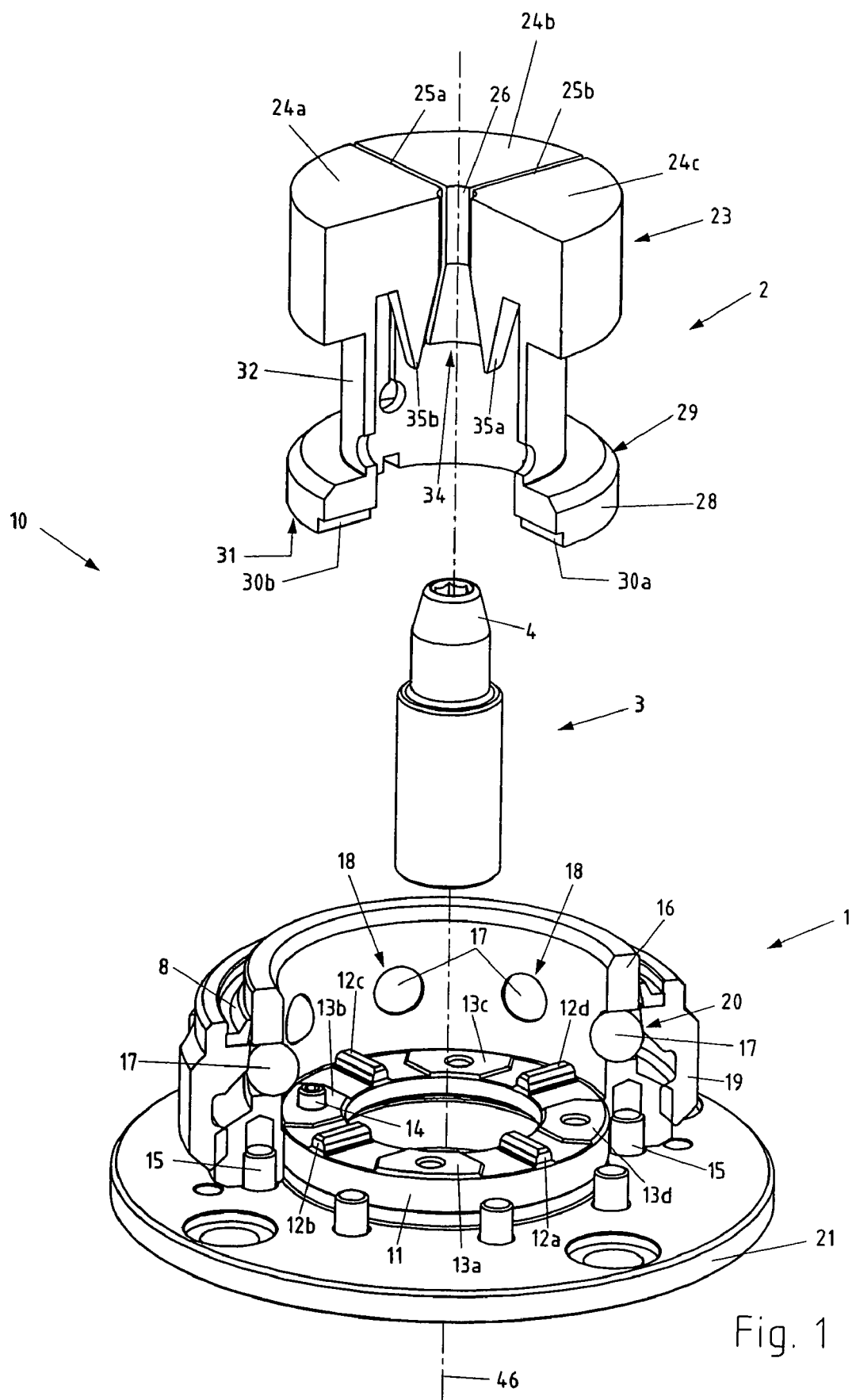
FIG. 1 shows an exploded view of a clamping apparatus comprising a chuck member and a collet member.

FIG. 1 shows an exploded view of a clamping apparatus 10, comprising a chuck member 1, a collet member 2 adapted to be clampingly fixed to the chuck member 1, and an actuating bolt 3. The Z-axis of the apparatus, simultaneously constituting the longitudinal central axis, is designated by reference numeral 46. Even if the actuating bolt 3 is shown in FIG. 1 separately, normally it constitutes an inherent part of the chuck member 1.

The chuck member 1 is provided with an annular protrusion 11. On the top front face of the protrusion 11, four centering cams 12a, 12b, 12c and 12d are located. The four centering cams 12a, 12b, 12c and 12d are evenly distributed along the circumference of the top front face of the protrusion 11. A first Z-axis rest surface 13a is located between the centering cams 12a and 12b, a second Z-axis rest surface 13b is located between the centering cams 12b and 12c, a third Z-axis rest surface 13c is located between the centering cams 12c and 12d, and a fourth Z-axis rest surface 13d is located between the centering cams 12d and 12a. All four Z-axis rest surfaces 13a, 13b, 13c and 13d are somewhat elevated above the top front face of the protrusion 11. In the center of the Z-axis rest surface 13b, an indexing pin 14 is provided, towering above the rest surface 13b.

The protrusion 11 is surrounded by an annular ball retainer 16, adapted to receive a plurality of clamping balls 17 distributed along an annulus and provided with an external male screw thread. The clamping balls 17 are received in bores 18 of the ball retainer 16. Screwed onto the outer male screw thread of the annular ball retainer 16 is a union nut 19, having an inner conical thrust surface 20 adapted to radially displace the clamping balls 17. The top of the union nut 19 is provided with a sealing lip 8, resting against the outside of the ball retainer 16. The ball retainer is attached to a base plate 21 by means of screws 15. The base plate 21 itself is provided with fixing means (not shown) to be attached to a suitably designed retainer means to be provided on the machine tool to which the clamping apparatus 10 is to be attached.

The actuating bolt 3 is to be located in the interior of the chuck member 1 and is axially movable, i.e. in Z-direction along the axis 46. The displacement of the actuating bolt 3 is performed preferably pneumatically. The front portion of the actuating bolt 3 is provided with a conical thrust surface 4, adapted to radially expand the collet member 2, as will be explained in more detail herein after.

The collet member 2, shown in FIG. 1 in a partially sectioned view, has essentially a hollow cylindrical shape. The front portion 23 of the collet member 2 is provided with slots 25a, 25b, dividing the front portion 23 of the collet member 2 into radially expandable and compressible clamping jaws 24a, 24b, 24c and 24d. Thus, the collet member 2 of this embodiment comprises a total of four slots and four clamping jaws. It is understood that the collet member 2 could be provided with fewer, for example three, or with more, for example six or eight, clamping jaws. The front portion 23 of the collet member 2 is provided with a central bore 26, the diameter thereof corresponding to the diameter of the shaft of the tool to be used with the particular collet member 2.

The back side of the collet member 2 is provided with an annular shoulder 28, having an annular front face 31 at its bottom. The annular front face 31 constitutes the Z-axis stop member when the collet member 2 is attached to the chuck member 1. The top side of the shoulder 28 is provided with an oblique thrust surface 29. The collet member 2 having been inserted into the chuck member 1, the clamping balls 17 engage the oblique thrust surface 29 to fix the collet member 2 to the chuck member 1.

The lower front face 31 of the collet member 2 is provided with centering grooves 30a, 30b, corresponding to the centering cams 12a, 12b, 12c, 12c as far as position and shape is concerned, and serving for positioning the collet member 2 with regard to the chuck member 1 both in X- and in Y-direction as well as regarding the angular position around the Z-axis. It is to be noted that the collet member 2 is provided with a total of four centering grooves 30; however, in the illustration of FIG. 1, only two of them, i.e. the grooves 30a and 30b are visible. Moreover, the annular front face 31 of the collet member 2 is provided with a indexing aperture, also not visible in FIG. 1, adapted to receive the indexing pin 14 provided on the chuck member 1. A shaft portion 32 constitutes the central portion of the collet member 2 and connects the front portion 23 of the collet member 2 with the shoulder 28.

The front portion 23 of the collet member 2 is provided with a conically narrowing recess 34 located at its back side. This recess 34 extends within the shaft portion 32 from the back side of the front portion 23 of the collet member 2 to the bore 26. The recess 34 is delimited by protruding, conically widening wall portions 35a, 35b. The wall portions 35a and 35b are subdivided by the slots 25a, 25b in the front portion 23 of the collet member 2. Thus, a total of four wall portions are present, separated from each other by the afore mentioned slots 25a, 25b. As soon as the actuating bolt 3 is pushed into the recess 34, the clamp jaws 24a, 24b, 24c (and also the forth clamp jaw not shown in FIG. 1) are radially forced apart.

It is understood that the configuration of the centering grooves and centering cams could be inverted, in other words, the centering cams could be provided on the collet member 2 and the centering grooves on the chuck member 1.

Figure 2:
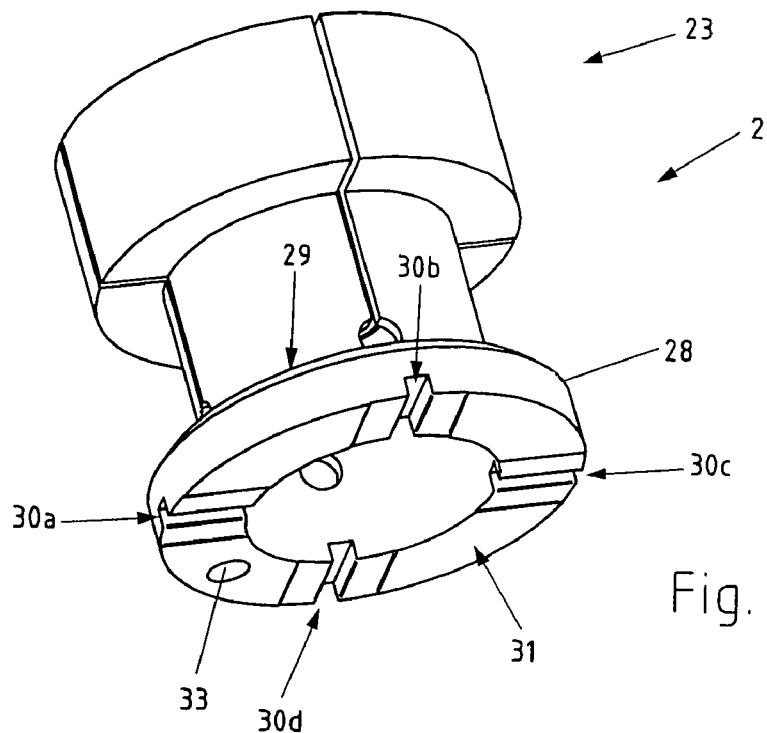
FIG. 2 shows a perspective bottom view of the collet member.

FIG. 2 shows a perspective view of the collet member 2 from the bottom. In this illustration, it is particularly shown that the four centering grooves 30a, 30b, 30c, 30d are machined into that front surface 31 of the shoulder 28 that is remote from the front portion 23 of the collet member 2, and that the shoulder 28 is provided with a thrust surface 29 adapted to engage the clamping balls 17 of the chuck member 1. Moreover, the indexing aperture 33 adapted to receive the indexing pin 14 is clearly visible, the cooperation of the indexing pin 14 and the indexing aperture 33 permitting an approximate definition of the position of the collet member 2 around the Z-axis and ensuring a correct attachment of the collet member 2 to the chuck member 1 as far as the approximate angular position around the Z-axis is concerned.

The annular surface portions of the rear front face 31 of the collet member 2, located between the centering grooves 30a, 30b, 30c, 30d, constitute the Z-reference surface of the collet member 2 upon clamping the collet member 2 to the chuck member 1. Due to the fact that the centering grooves 30a, 30b, 30c, 30d are machined into the shoulder 28 of the collet member 2 in the region of the thrust surface 29, as seen in axial direction, and also due to the fact that the collet member 2 is fixed in Z-direction at this thrust surface 29 by means of a plurality of clamping balls 17 arranged along an annulus, the collet member 2 can be fixed to the chuck member 1 in a very well defined position regarding all three axes and the angular orientation, and it can accept very high forces, particularly also in radial direction.

Figure 3:
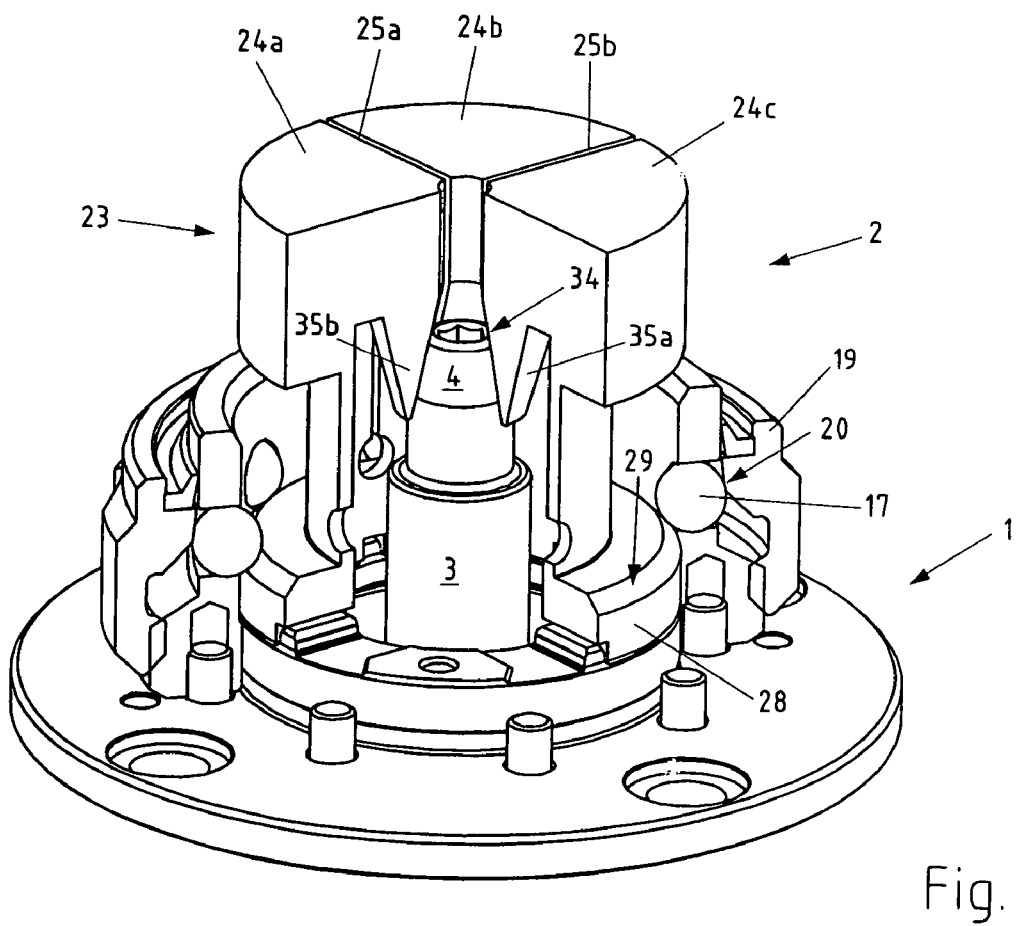
FIG. 3 shows a partially longitudinally sectioned view of the chuck member and the collet member attached thereto.

FIG. 3 shows a partially longitudinally sectioned view of the chuck member 1 and the collet member 2 attached thereto. The collet member 2 is fixed to the chuck member 1 by means of the clamping balls 17 engaging the thrust surface 29 provided on the shoulder 28. The clamping balls 17 are pressed radially inwards by the thrust surface 20 of the union nut 19, the latter one having been manually rotated into its operating position as shown on FIG. 3. Due to the fact that the clamping balls 17 are pushed against the thrust surface 29 of the shoulder 28 of the collet member 2, the collet member 2 is pressed against the chuck member 1 in Z-direction. The actuating bolt 3 provided for radially forcing apart the clamping jaws 24 of the collet member 2 is shown in FIG. 3 in its upper operating position. When the actuating bolt 3 is pushed upwards, its conical thrust surface 4 engages the wall portion of the recess 34 and the conically widening wall portions 35a, 25b, respectively, with the result that the clamping jaws 24a, 24b, 24c (and also 24d, not shown in FIG. 3) of the collet member 2 are forced apart in radial direction.

Such a clamping apparatus 10 is particularly suitable for fixing work pieces or tools that are attached to the collet member 2 by radially forcing apart the clamping jaws thereof. The hollow work piece to be attached to the collet member 2

(not shown) is pushed over the collet member 2 such that it is fixed along the circumference of the collet member 2 by radially forcing the clamping jaws apart. Thereby, the outline of the collet member 2 is preferably adapted to match the inner contour of a recess in the work piece to be fixed to the chuck member 1. Another possibility is to provide an adapter that can be attached to the work piece and that has a hollow portion matching the outline of the collet member 2; it is also possible to match the work piece itself to the outline of the collet member 2.

As long as the actuating bolt 3 is pushed into the recess 34 of the collet member 2, the work piece is fixed to the collet member 2. The actuating bolt 3 having been pulled back, the work piece can be removed from the collet member 2, because the clamping jaws 24 resiliently return into their unloaded initial position.

Basically, it is true that the four centering cams 12a, 12b, 12c, 12d of the chuck member 1 enter the four centering grooves 30a, 30b, 30c, 30d of the collet member 2 upon attaching the collet member 2 to the chuck member 1. Thereby, the collet member 2 is positioned with regard to the chuck member 1 in X- and Y-directions as well as regarding its angular orientation around the Z-axis. The centering grooves 30a, 30b, 30c, 30d of the collet member 2 are dimensioned and adapted to the size of the centering cams 12a, 12b, 12c, 12d of the chuck member 1 such that the centering cams 12a, 12b, 12c, 12d of the chuck member 1 enter the centering grooves 30a, 30b, 30c, 30d of the collet member 2 that far, the collet member 2 being loosely put onto the chuck member 1, that a gap with a width in the range of 0.01 to 0.1 mm remains between the Z-axis rest surfaces 13a, 13b, 13c, 13d of the chuck member 1 and the annular front face 31 of the collet member 2. Upon tightening the union nut 19, this gap disappears since the centering cams 12a, 12b, 12c, 12d of the chuck member 1 enter the centering grooves 30a, 30b, 30c, 30d of the collet member 2 deeper, i.e. by the amount of the width of the former gap. Thereby, advantage is taken of the inherent elasticity of the material, usually steel, insofar as the centering grooves 30a, 30b, 30c, 30d of the collet member 2 are somewhat widened. Such deformation occurs within the region of the elasticity of the material; the result is that centering elements can be avoided that are resiliently elastic in Z-direction. The union nut 19 having been tightened, the collet member 2 rests with its annular front face 31 on the rest surfaces 13a, 13b, 13c, 13d serving as Z-axis reference surfaces; thus, the position of the collet member 2 with regard to the chuck member 1 is exactly defined in Z-direction, too.

FIG. 4 shows a perspective view of another embodiment of the clamping apparatus. The collet member 2a is provided with an oval recess 37 for fixing a corresponding work piece 39. The bottom 38 of the recess 37 constitutes the Z-reference surface for the work piece 39. In this case, the work piece 37 is not fixed to the collet member 2a by radially forcing out the clamping jaws thereof, but by radially forcing in the latter ones. Such radial forcing in of the clamping jaws is effected by an actuating bolt 3a having a different design, as will be further explained herein after with reference to FIG. 5.

FIG. 5 shows a longitudinal sectional view of the clamping apparatus according to FIG. 4. Clearly visible is the actuating bolt 3a. Instead of a conical thrust surface, the actuating bolt 3a is provided with a recess 36, the inside shape of which substantially corresponding to the outline of the wall portions 35a, 35b delimiting the recess 34 in the collet member 2a. The inside of the recess 36 of the actuating bolt 3a engages the outside of the conical wall portions 35a, 35b when the actuating bolt 3a is pushed upwards, with the result that the clamping jaws are forced inwards, thus clamping the work piece 39 in the collet member 2a.

FIG. 6 shows another embodiment of a collet member 2. The collet member 2 is provided with a clamping stud 41, serving for pulling in and fixing the collet member 2 to the chuck member 1. The lower end of the clamping stud 41 is provided with a peripheral shoulder 42, having a beveled thrust surface 43 that can be engaged by the clamping balls 17 of the chuck member 1. It is understood that the chuck member 1 has to match a collet member 2 provided with a clamping bolt 41. Particularly, the clamping balls 17 of the chuck member 1 have to be located further downwards. Preferably, the clamping bolt 41 is of hollow cylindrical shape; thereby it is possible to provide an actuating bolt extending through the clamping bolt 41 and serving for forcing apart or forcing in the clamping jaws.

A collet member 2 designed along the lines of the present invention can be fixed to a chuck member 1 directly, simply, quickly and in a well defined position.

The provision of a union nut 19 that has to be manually screwed on to fix the collet member 2 has the advantage that the clamping apparatus 10 is of a very compact design and can be manufactured in a cost effective manner. Instead of a manually applicable union nut for fixing the collet member, the chuck member 1 could be provided with a spring-loaded, pneumatically or hydraulically displaceable clamping piston whose inside comprises a conically narrowing thrust surface for radially displacing the clamping balls. If a collet member without a clamping bolt is used, the entire clamping apparatus can be designed in a very compact manner.

What is claimed is:

1. A clamping apparatus, comprising:
   a chuck member having a clamping element adapted to clampingly fix a collet member thereto;
   a collet member adapted to be fixed to said chuck member and having first centering means for aligning the position of said collet member with regard to said chuck member;
   said chuck member having second centering means for aligning the position of said collet member with regard to said chuck member and cooperating with said first centering means of said collet member;
   said first centering means of said collet member including a plurality of first centering elements located at the rear side of said collet member facing said chuck member;
   said second centering means of said chuck member including a plurality of second centering elements corresponding to said plurality of first centering elements of said collet member regarding size and location and adapted to engage said first centering elements of said collet member upon fixing said collet member to said chuck member to align said collet member with regard to said chuck member at least in X- and Y-directions; and
   said collet member being provided with a peripheral shoulder incorporating said plurality of first centering elements, said peripheral shoulder providing a thrust surface adapted to be engaged by said clamping element of said chuck member to clampingly fix said collet member to said chuck member.

2. A clamping apparatus according to claim 1, in which said first centering elements are located on the back surface of said peripheral shoulder remote from the front portion of said collet member, whereby the surface areas of said back surface between said first centering elements are adapted to constitute Z-reference surface portions to define the Z-position of said collet member when said collet member is fixed to said chuck member.

3. A clamping apparatus according to claim 2, in which said first centering elements include at least three centering grooves arranged along an annulus and evenly distributed along said annulus for positioning said collet member with regard to said chuck member in X- and Y-directions as well as regarding its angular orientation.

4. A clamping apparatus according to claim 2, in which said first centering elements include at least three centering cams arranged along an annulus and evenly distributed along said annulus for positioning said collet member with regard to said chuck member in X- and Y-directions as well as regarding its angular orientation.

5. A clamping apparatus according to claim 1, in which said chuck member includes at least three of said second centering elements corresponding to said first centering elements of said collet member regarding size and location, said clamping element of said chuck member including a plurality of clamping balls for clampingly fixing said collet member to said chuck member.

6. A clamping apparatus according to claim 5, in which said clamping element further includes a union nut, the inside thereof having a conically narrowing thrust surface adapted to radially displace said clamping balls upon tightening said union nut.

7. A clamping apparatus according to claim 1, in which the rear side of a front portion of said collet member is provided with a conically narrowing recess, subdivided by radially extending slots, and said chuck member is provided with an actuating bolt adapted to be pushed into said conically narrowing recess of said front portion of said collet member to radially expand said collet member.

8. A clamping apparatus according to claim 1, in which the rear side of a front portion of said collet member is provided with a recess delimited by protruding, conically widening wall portions and subdivided by radially extending slots, and said chuck member is provided with an actuating bolt having a recess in its front face that is adapted to be pushed over said conically widening wall portions of said front portion of said collet member to radially contract said collet member.

9. A clamping apparatus according to claim 1, in which said collet member is provided with an indexing bore for determining its approximate angular orientation around the Z-axis upon inserting it into said chuck member.

10. A clamping apparatus, comprising:
a chuck member having a clamping element adapted to clampingly fix a collet member thereto;
a collet member adapted to be fixed to said chuck member and having first centering means for aligning the position of said collet member with regard to said chuck member;
said chuck member having second centering means for aligning the position of said collet member with regard to said chuck member and cooperating with said first centering means of said collet member;
said first centering means of said collet member including a plurality of first centering elements located at the rear side of said collet member facing said chuck member;
said second centering means of said chuck member including a plurality of second centering elements corresponding to said plurality of first centering elements of said collet member regarding size and location and adapted to engage said first centering elements of said collet member upon fixing said collet member to said chuck member to align said collet member with regard to said chuck member at least in X- and Y-directions; and
said collet member including a clamping stud provided with a thrust surface adapted to be engaged by said clamping element of said chuck member to clampingly fix said collet member to said chuck member,
wherein said collet member is provided with a peripheral shoulder incorporating said plurality of first centering elements, said first centering elements being located on a back surface of said peripheral shoulder remote from the front portion of said collet member, whereby the surface areas of said back surface between said first centering elements are adapted to constitute Z-reference surface portions to define the Z-position of said collet member when said collet member is fixed to said chuck member.

11. A clamping apparatus according to claim 10, in which said chuck member includes at least three of said second centering elements corresponding to said first centering elements of said collet member regarding size and location, said clamping element of said chuck member including a plurality of clamping balls for clampingly fixing said collet member to said chuck member.

12. A clamping apparatus according to claim 10, in which the rear side of a front portion of said collet member is provided with a conically narrowing recess, subdivided by radially extending slots, and said chuck member is provided with an actuating bolt adapted to be pushed into said conically narrowing recess of said front portion of said collet member to radially expand said collet member.

13. A clamping apparatus according to claim 10, in which the rear side of a front portion of said collet member is provided with a recess delimited by protruding, conically widening wall portions and subdivided by radially extending slots, and said chuck member is provided with an actuating bolt having a recess in its front face that is adapted to be pushed over said conically widening wall portions of said front portion of said collet member to radially contract said collet member.

14. A clamping apparatus according to claim 10, in which said collet member is provided with an indexing bore for determining its approximate angular orientation around the Z-axis upon inserting it into said chuck member.

* * * * *